United States Patent [19]

Lassiére

[11] 4,132,428
[45] Jan. 2, 1979

[54] FOLDABLE BICYCLE
[75] Inventor: Alan Lassiére, Surrey, England
[73] Assignee: A. Lassiére Ltd., Surrey, England
[21] Appl. No.: 799,768
[22] Filed: May 23, 1977
[30] Foreign Application Priority Data
 May 21, 1976 [GB] United Kingdom ............... 21076/76
[51] Int. Cl.² ............................................. B62K 15/00
[52] U.S. Cl. ................................ 280/278; 280/281 R
[58] Field of Search ................... 280/278, 236, 281 R, 280/287, 274

[56] References Cited
U.S. PATENT DOCUMENTS

| | | | |
|---|---|---|---|
| 3,294,416 | 12/1966 | Carnielli | 280/278 |
| 3,979,136 | 9/1976 | Lassiere | 280/278 |
| 3,993,322 | 11/1976 | Tijen | 280/278 |
| 4,026,573 | 5/1977 | Richardson | 280/278 |

FOREIGN PATENT DOCUMENTS 108208  8/1917  United Kingdom ..................... 280/278

Primary Examiner—Joseph F. Peters, Jr.
Assistant Examiner—Michael Mar
Attorney, Agent, or Firm—Charles E. Baxley

[57] ABSTRACT

This invention teaches a foldable bicycle divided into a front frame part and a rear frame part. The front frame part and the rear frame part are hingedly and slideably connected together. A front fork and steering assembly is hingedly connected to the front frame part. A saddle supporting assembly is hingedly connected to the rear frame part. Locking structures are provided in operative association with each of the hinged connections.

17 Claims, 6 Drawing Figures

FOLDABLE BICYCLE

BACKGROUND OF INVENTION

This invention relates to a foldable bicycle and it is an improvement with respect to my U.S. Pat. No. 3,979,136. A number of designs of foldable bicycles are known and several of these rely on provision of hinges in a conventional bicycle frame of diamond configuration. In addition, some of these designs provide for turning of handlebars into the plane of the frame. Because the wheels are of standard diameter (i.e., approximately 26") and because the pedals still project at right angles to the plane of the frame, the folded dimensions of these bicycles are not such as to permit easy carrying and storage in confined spaces. In these designs the folding is essentially an afterthought applied to a bicycle of conventional configuration.

Other known designs provide for foldable elements such as handlebars and/or pedals, without folding the main frame.

Yet other known designs provide for telescoping or folding of some elements (e.g., handlebars and saddle tube) and of the main frame at one point, and employ small wheels to reduce the folded dimensions. Such designs realize some, but not all, the potential reduction in folded dimensions achievable by (a) multiple folding of the main frame, and of certain components, and (b) use of small wheels.

STATEMENT OF INVENTION

It is among the objects of the present invention to provide a foldable bicycle which overcomes, or substantially reduces, the disadvantages of known foldable bicycles.

According to the present invention, there is provided a portable foldable bicycle divided into a front frame part and a rear frame part. The front frame part and the rear frame part are hingedly connected together. A front fork and steering assembly is hingedly connected to the front frame part. A saddle supporting assembly is hingedly connected to the rear frame part. Locking means are provided in operative associated with each of the hinged connections.

DESCRIPTION OF DRAWINGS

The foregoing objects, features and advantages will appear more fully from the accompanying drawings in which like numeral designations refer to like parts and in which:

Referring to the drawings it will be noted that for the sake of clarity certain parts are shown in dotted outline, or are omitted. Brake cables, gear lever and gear cable, front and rear lights and reflectors have been omitted in all drawings. In FIG. 1 the rear caliper brake has been omitted. In FIG. 2 the brake levers have been omitted. In FIG. 3 the rear main frame tubes and the main hinge structure have been omitted.

DESCRIPTION OF PREFERRED EMBODIMENT

Figure 1:
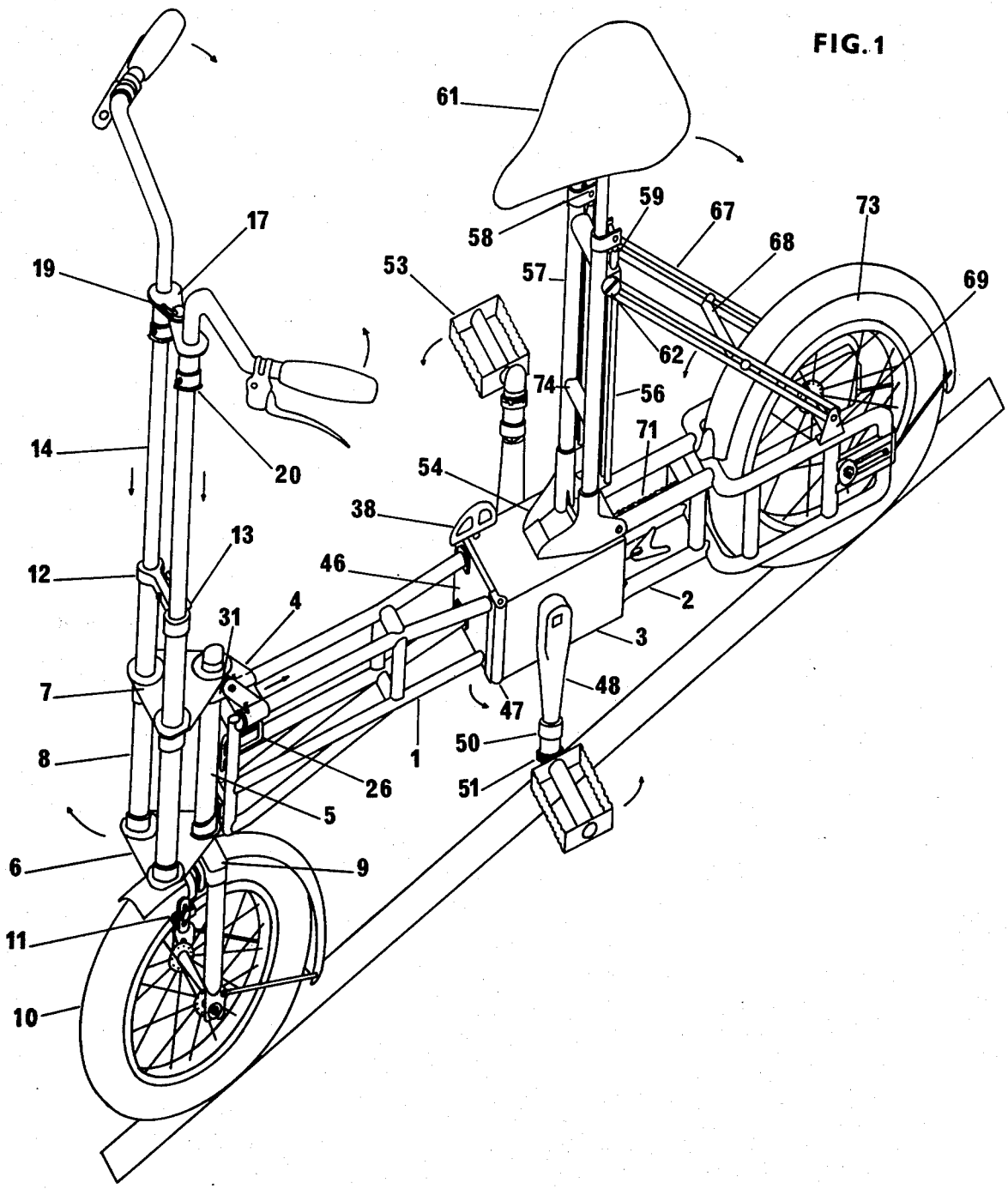
FIG. 1 is a perspective view of the bicycle unfolded.

The main frame, FIG. 1, is built up from steel tubing about $\frac{1}{2}$" in diameter brazed or welded together. It consists of a front frame and a rear frame, connected by a hinge with a vertical axis at the mid point (approximately) of the frame. The front half consists of four longitudinal tubes disposed so that they lie at the corners of a rectangle when viewed in section, connected by vertical and horizontal spacer tubes at various points. The rear half also has four longitudinal tubes which connect to a U-frame containing the rear wheel.

The front frame 1 consists of two upper and two lower tubes. All four tubes are brazed to a hinge plate 46 at the rear end of the front frame. The main hinge axis 47 is at one edge of this plate. The hinge plate has turned edges, which fit over the front end of the gearcase 3; this prevents torsion of the front frame relative to the rear frame when the bicycle is in use. At its front end the front frame has a locking device see FIG. 4, built into it, to retain the front assembly in position, when the bicycle is being ridden. This device consists of a square tube 25 containing a spring loaded tapered bolt 24. When the front assembly is rotated into position, a horizontal bar 27 attached to it by trunnions 28 lifts the tapered bolt. The bolt then comes down under spring action behind the horizontal bar, locking the front assembly into position automatically. The bolt is released by pulling on a handle 26 fitted at its upper end. The two upper tubes of the front frame act as guide tubes for a sliding bracket 4. The whole of the front assembly is hinged to bracket 4.

The front assembly consists of a front wheel 10, front forks 9, a lower mounting plate 6, and an upper mounting plate 7, a swiveling unit for steering purposes, a pair of spaced socket tubes 8, a locking device 12 to fix the height of the handlebars and a spacer-cum-angular lock 17 between the handlebar tubes.

Figure 4:
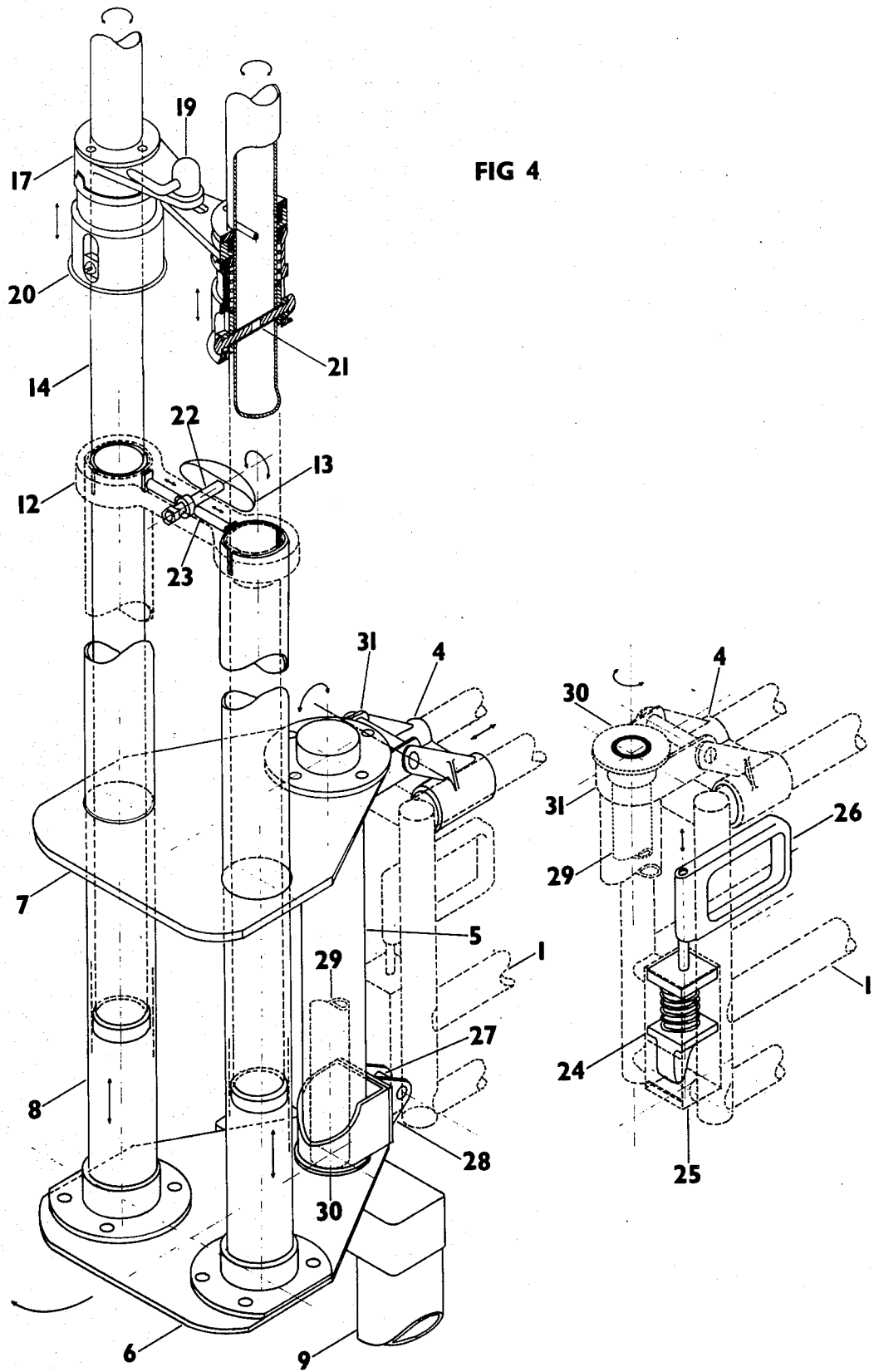
FIG. 4 is a perspective view of the connection between the front frame part and the front fork and steering assembly, together with the handlebars height and angular locks.

The swiveling unit, FIG. 4 consists of an inner tube 29, fixed at its ends to the lower and upper mounting plates 6 and 7. There is a bearing 30 at each end of the inner tube. The whole front assembly rotates about the axis of the inner tube for steering purposes. The outer tube 5 acts as a housing for the two bearings. The outer tube has a bracket 31 round it at its top end, connecting it to the sliding bracket 4. As its lower end trunions 28 are fitted carrying the bar 27 which is wedged inside the square tube locking device at the front end of the front frame.

The handlebar tubes can be pushed up and down for height adjustment, or for folding, FIG. 4. They are locked in position by the unit 12. This contains two pins 23 which are pushed outwards by a cam profile on the shaft 22 of the handle 13 when this is rotated. The socket tubes 8 are compressed against the handlebar tubes 14 preventing vertical movement.

The handlebars take up their angular position automatically (when viewed in plan) when the bicycle is unfolded, FIG. 4. This is achieved by a pair of spring loaded sleeves 20 fitted on the handlebar tubes. These have tapered dogs at one end which engage in recesses on the collars 17, when the handlebars have been rotated outwards to the pre set angular position. The angular setting of the handlebars may be altered by releasing the clamp 19 and adjusting the collars 17. Rotation of the spring loaded sleeves is prevented by the pins 21 projecting through slots in the sleeves 20.

When the front assembly is to be folded, the sleeves 20 are pushed down and the handlebars rotated through 90° so that the gripping portions are approximately parallel. The handle 13 is released so that the handlebar tubes can be pushed down until they project beyond the lower ends of the socket tubes, on either side of the front wheel. The locking bolt 24 is released by the handle 26 and the whole front assembly is rotated about the transverse axis of bracket 4. Then the assembly is slid back until the bracket 4 is about half way back along the top tubes of the front frame, FIG. 2.

The rear frame consists of a gearcase 3 containing the gear train, and the rear frame tubes. The gear train is identical in design to that described in U.K. Pat. No. 1,427,477 and U.S. Pat. No. 3,979,136. The drive between the pedals and the rear wheel is effected by a conventional chain 71 and sprockets. However the front sprocket 79 is of similar size to that of the rear sprocket 70 rather than being provided with a larger number of sprocket teeth as in a conventional bicycle. Also the rear wheel is of smaller diameter than that of a conventional bicycle. For these two reasons, one revolution of the pedal cranks will not advance the folding bicycle as far as one revolution of the pedal cranks of a standard bicycle. To obtain a comparable advance per pedal crank revolution a step up gear train is employed.

The gear train, comprises a spur gear 80 fixed inside the gearcase 3 on the shaft 78 carrying the pedal cranks 48. A needle roller bearing is mounted on the shaft and the housing of this bearing has a small spur gear wheel 81 and the front chain sprocket 79 machined integrally on it. A lay shaft 82 is mounted inside the gearcase 3 parallel to, and behind the pedal shaft and a needle bearing is mounted on the lay shaft. The housing of the needle bearing has a large spur gear 83 and a second, smaller, spur gear 84 machined integrally on it. The large spur gear 80, is fixed to the shaft 78 by the key 85. The gear 80 meshes with the small gear 84 on the lay shaft and the large gear 83 meshes with the small gear 81 on the pedal shaft 78. Thus the front chain sprocket on the pedal shaft rotates coaxially with the pedal shaft 78, but it has an angular velocity about five times that of the pedal shaft. The step up achieved depends on the number of teeth on the four gear wheels in the train. Conventional gear ratios may be obtained by fitting a standard three speed hub in the rear wheel 73. The pedal shaft is mounted in bearings fixed internally to the gearcase.

A light alloy chaincase (not shown in the drawings) covers the chain and the rear sprocket. The upper surface of the gearcase 3 provides a mounting platform for the seat tubes assembly. At the front end of the gearcase there is a locking device to connect the front frame and rear frame in their in-line operative position, FIG. 3. This consists of a square tube 32 containing two tapered bolts, 35, 45, sliding on a central rod 37 and separated by a compression spring 43. Two trunnions, 33 and 44 (see FIG. 2) are mounted on the inner face of the hingeplate 46. When the hinge plate 46 is closed, the upper bar 34 pushes the upper bolt 35 down, and the similar lower bar 77 pushes the lower bolt 45 up. The tapered bolts then move apart under spring action, to lock the hinge plate in position. The bolts are released by turning handle 38 in an anti-clockwise direction (when viewed in plan). The rod 37 and the pin 36 are made to rotate anti-clockwise by this movement. The pin 36 rides on a helical cam profile on bolt 35; the bolt is pushed down and its tapered section disengages from bar 34 when pin 36 rotates. By a similar action pin 89 rides on a helical cam profile on bolt 45 and lifts it, releasing the bar 77. The hinge plate 46 with the whole front half of the bicycle attached to it is then free to swing through 180° about the hinge axis 47 until it lies beside the rear frame (see FIG. 2).

Figure 2:
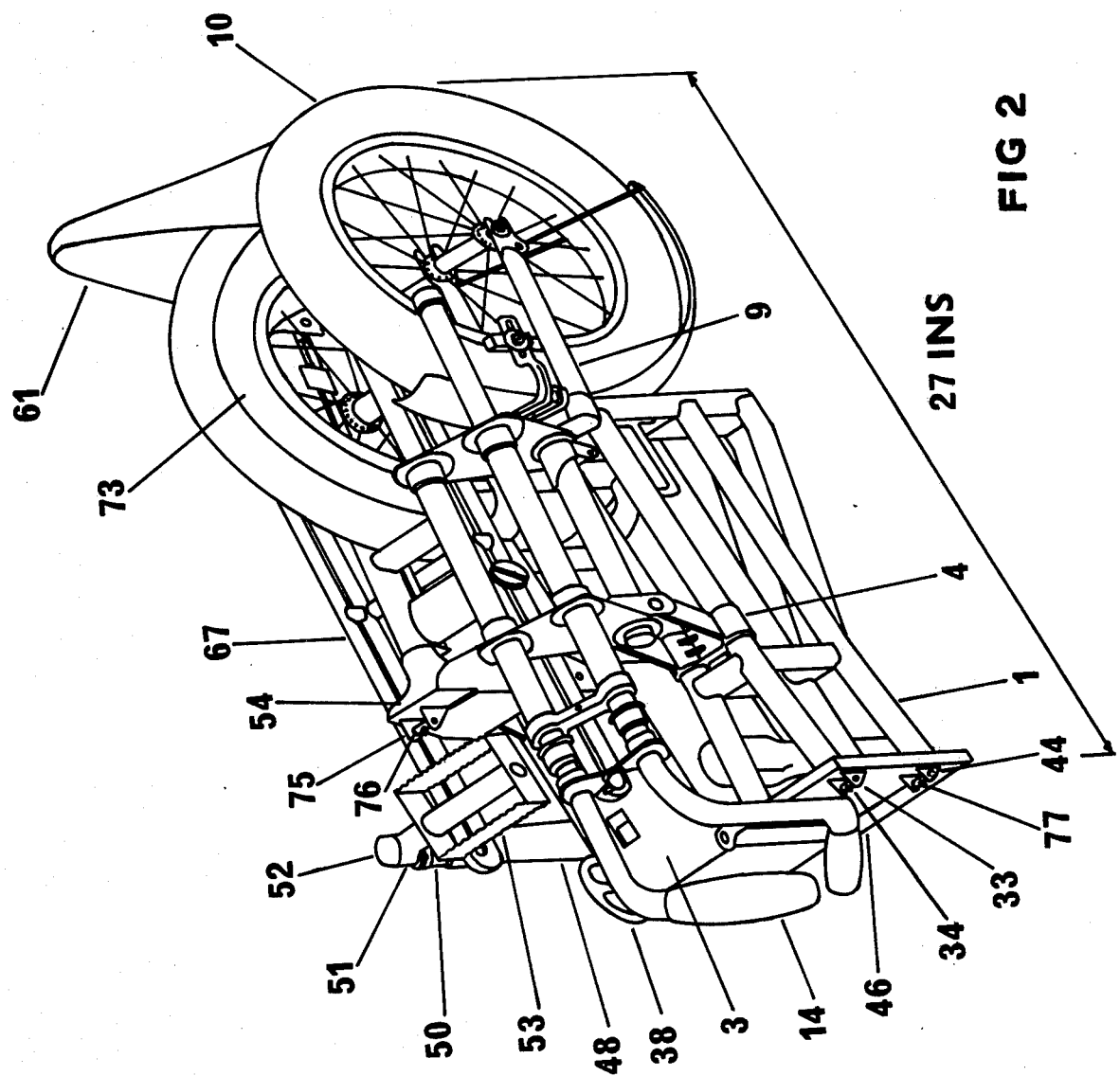
FIG. 2 is a perspective view of the bicycle folded.
Figure 3:
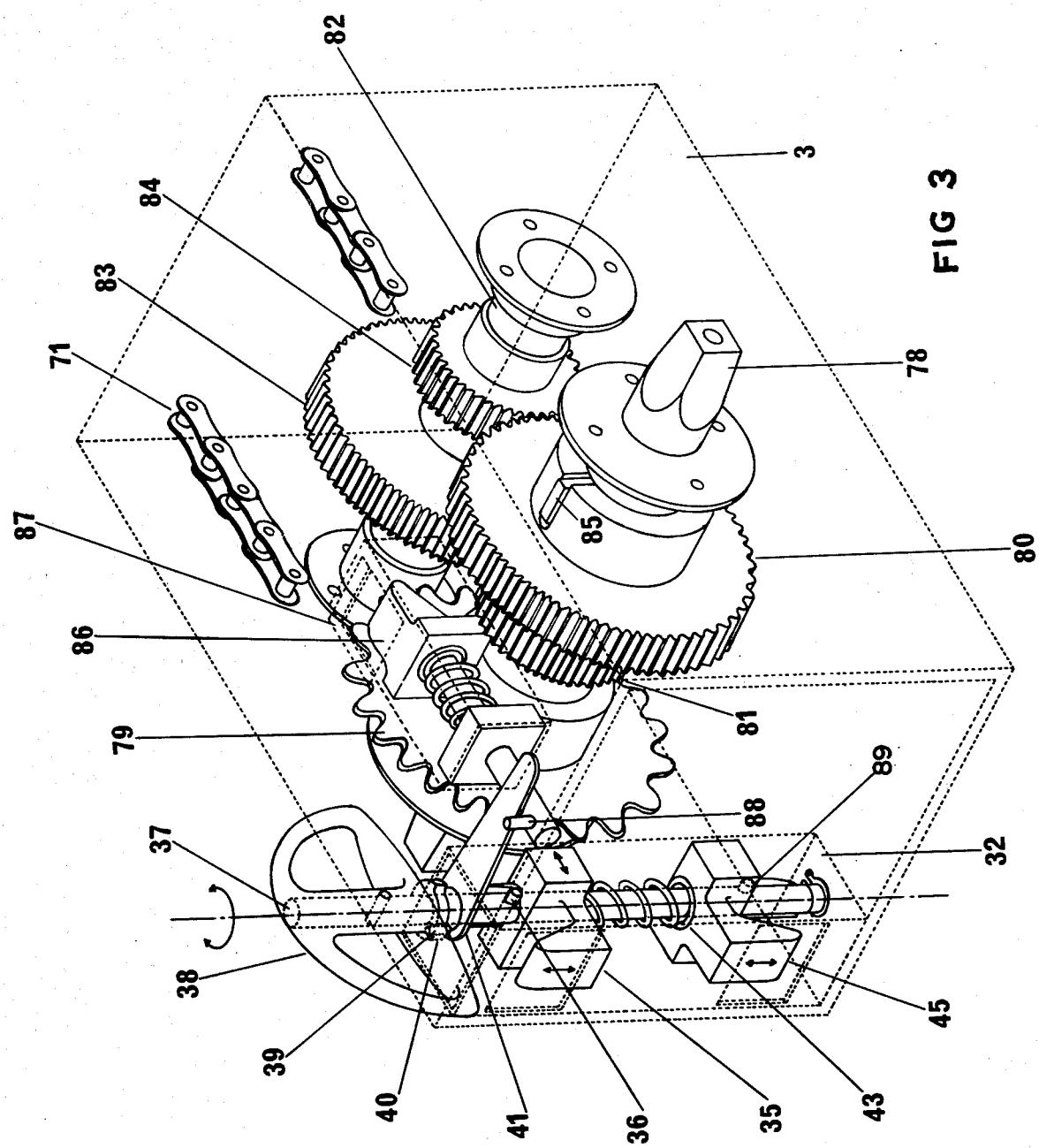
FIG. 3 is a perspective view of the drive system, together with the main hinge locking system and the saddle supporting assembly locking system.
Figure 6:
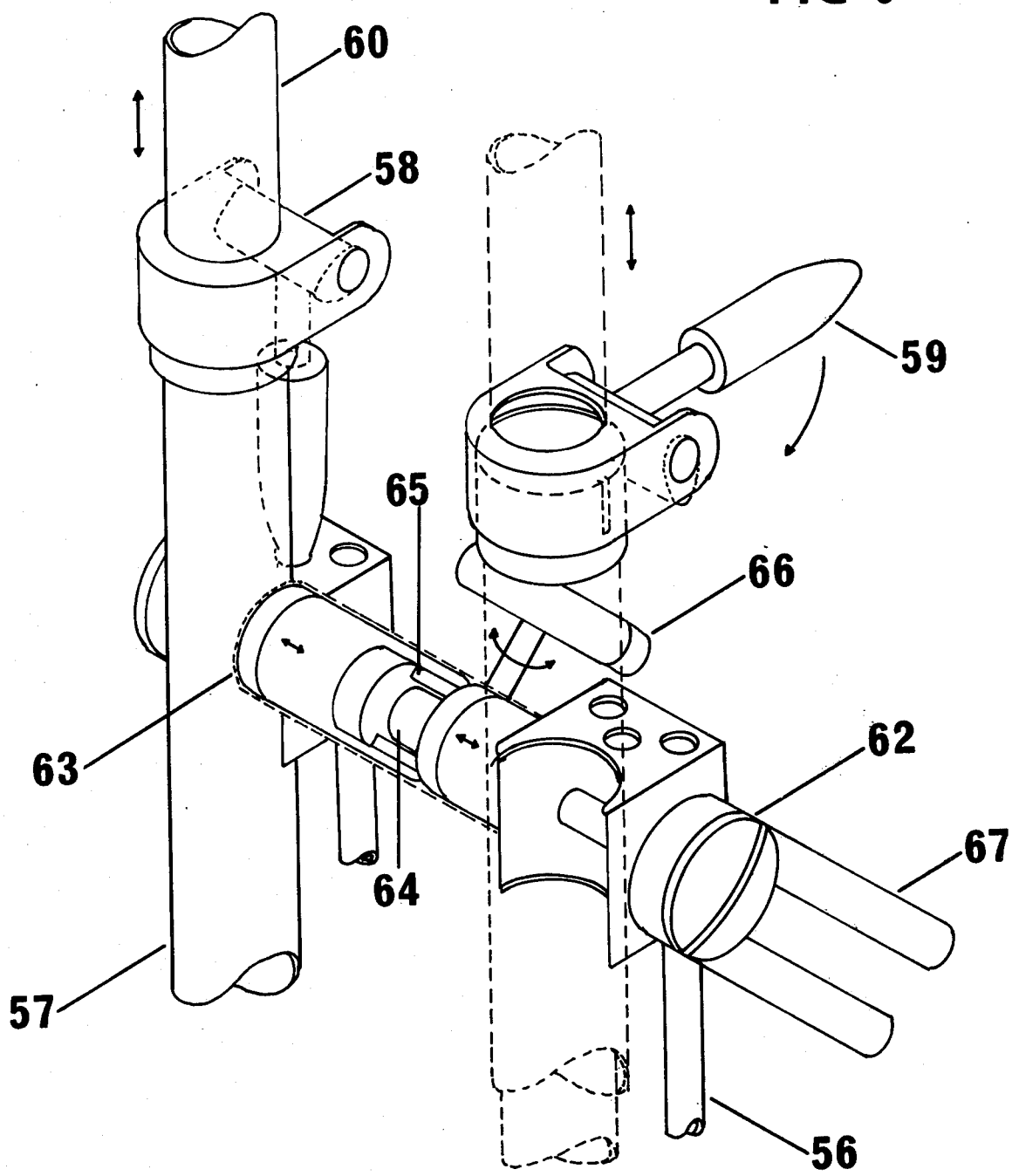
FIG. 6 is a perspective view of the lock between the saddle support assembly and the rear stays, together with the saddle height lock.

The saddle supporting assembly consists of a pair of seat tubes 57 mounted in a light alloy casting 54 and connected by a tube 74 with a pair of saddle tubes 60 fitted inside the seat tubes. The saddle height may be adjusted by releasing the cam 58 using the handle 59 and sliding the saddle tubes up or down as necessary. The casting 54 can rotate about the horizontal axes of two brackets fixed to the top surface of the gearcase 3. A guide tube 56 is attached behind each seat tube 57. The rear stays 67 consist of two pairs of tubes with a ¼" gap between them to allow the rear stay lock to slide half way along their length when the saddle support assembly is folded. The lower ends of the rear stays are hinged to brackets 69 fixed to the rear frame 2. There is a transverse tube 68 connecting the two stays. The rear stays are positioned outside the seat tubes (see FIG. 1). When the assembly is folded the seat and saddle tubes rotate back and down until the tubes lie on either side of the rear wheel 73 (see FIG. 2). At the same time the rear stays rotate forward and down to lie outside the seat tubes (see FIG. 2). The combined motion of seat tubes and rear stays causes the rear stay lock 62 to slide along the slot between the seat tubes 57 and the guide tubes 56, as well as along the slots between the tubes forming the rear stays 67. The unfolded position of the rear stay lock 62 is shown in FIG. 1; the folded position is shown in FIG. 2. The rear stay lock, FIG. 6, consists of a pair of flat headed bolts 62 screwed into a central collar 64. A pair of pressure pads 63 is mounted on the bolts 62. To clamp the rear tubes 57 to the rear stays 67, it is necessary to apply pressure outwards on the pads 63. This is achieved by rotating handle 66 connected to the cam plates 65. The locking force is removed by turning the cam plates through 90° using the handle 66.

To fold the saddle support assembly two actions are needed, firstly the rear stay lock is released, then seat tubes lock is released. The seat tubes lock FIG. 3, consists of a spring loaded tapered bolt 86 mounted inside a horizontal square tube 87 inside the gearcase 3. The tapered bolt engages the bar 76 mounted on trunnions 75 fixed to the lower surface of the casting 54 (see FIG. 2). To release the bolt, the handle 38 is rotated in a clockwise direction (when viewed in plan). The pin 39 engages the cam 40 which is connected to the lever 41. The lever 41 acts on the pin 88 drawing the tapered bolt 86 back and releasing the bar 76. The saddle support assembly can then be rotated until the folded position of FIG. 2 is reached.

Figure 5:
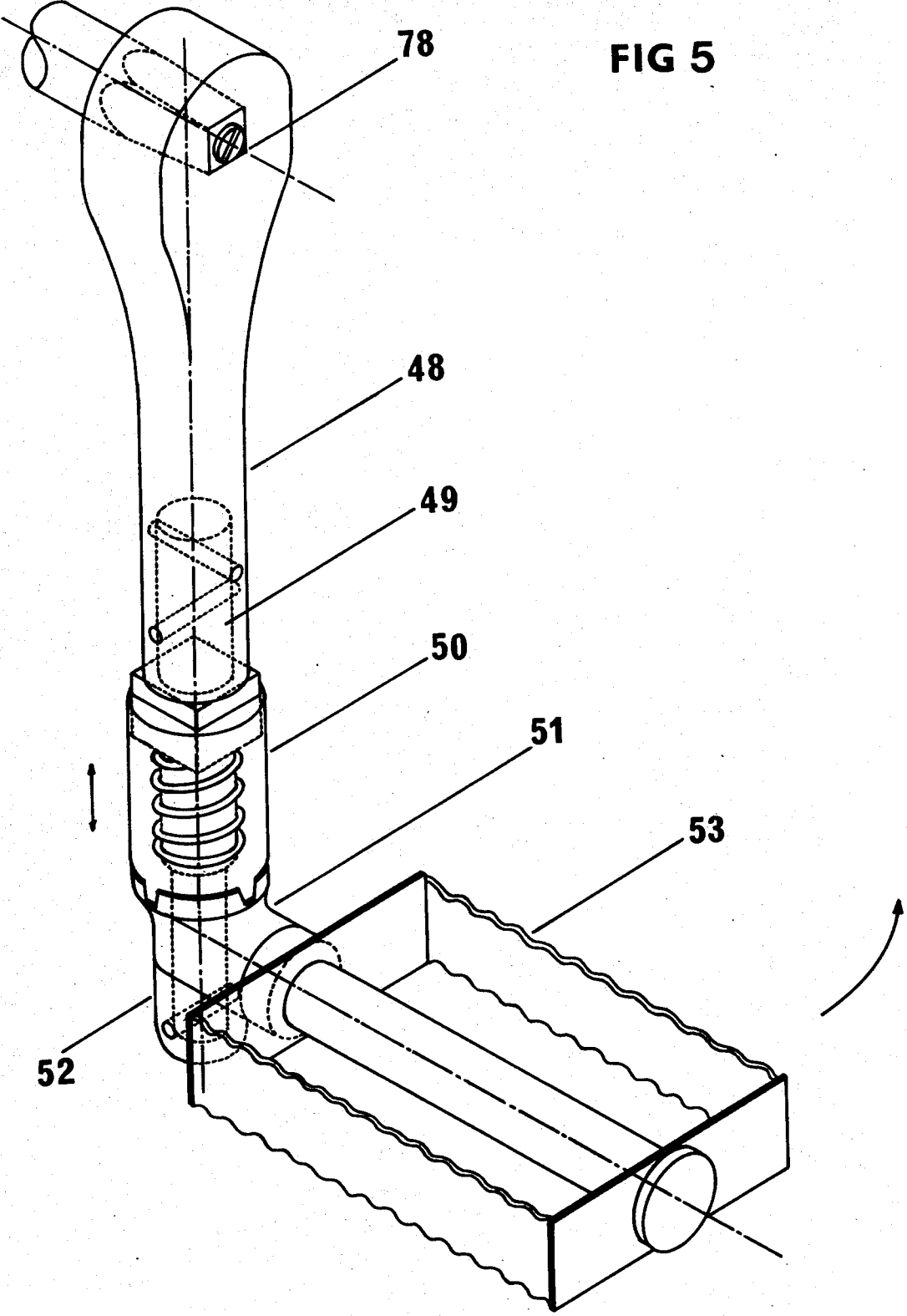
FIG. 5 is a perspective view of the crank and pedal assembly.

The pedal crank assembly, FIG. 5, consists of the crank 48, a round shaft 49 with a central square section, pinned to it, a spring loaded sleeve 50 with a square hole at one end and tapered dogs at the other end, a rotatable collar 51 with tapered recesses, and a boss 52. A standard pedal 53 is screwed into a threaded housing on the collar 51. In the operation position the tapered dogs on the sleeve 50 engage the tapered recesses on the collar 51. The sleeve and collar cannot rotate because the square hole in the sleeve engages the square section of the shaft 49. To fold the pedal the sleeve 50 is pulled up so that its dogs disengage from the recesses on the collar 51. The collar and pedal are then rotated through 90°. The sleeve 50 is then released to retain the pedal in its folded position.

Folding the bicycle involves the following operations:

(i) Folding the handlebars. The handlebar height locking unit 12 is released by turning the handle 13 through 90°. The handlebar tubes 14 can now be pushed down until their lower ends project below the socket tubes 8 on either side of the front wheel 10. The angular folding of the hand grips through approximately 90° is achieved by pulling down the spring loaded sleeves 20 in turn and turning the handlebar tubes when the dogs on the sleeves disengage from the recesses on the collars 17.

(ii) Folding the front assembly. The handle 26 is pulled up releasing the tapered bolt 24 from the bar 27. The whole front assembly (with the handlebar tubes telescoped and folded) is now free to rotate about the common transverse axis of bracket 31 and slider bracket 4. A rotation of 90° is followed by a translation of the slider bracket (with the front assembly above it) along the two upper tubes of the front frame 1.

(iii) Folding the saddle assembly. This involves two steps. First the rear stays lock is released by turning the handle 66 so that the rear stays 67 take up a horizontal position. The handle 38 is rotated clockwise to release the bar 76. The seat tubes assembly is then rotated back through approximately 90°.

(iv) Folding the pedals. The spring loaded sleeves 50 are lifted in turn and the pedals 53 rotated to the desired position. The sleeves are then released.

(v) Folding the main frame. This is achieved by rotating the handle 38 anticlockwise which releases the bars 34 and 77. The front half is swung through 180° about the axis 47 until it lies beside the rear half of the bicycle.

Unfolding the bicycle involves the following operations:

(i) Unfolding the main frame. A 180° rotation of the front half brings its axis into line with that of the rear half. The upper tapered bolt 35 snaps over the bar 34 and the lower tapered bolt 45 snaps over the bar 77 under the action of spring 43. The two halves of the bicycle become locked together without the need for specific locking operations by the user.

(ii) Unfolding the pedals. The sleeves 50 are lifted and the pedals turned to the operating position. The sleeves are released and the pedals are locked in place.

(iii) Unfolding the saddle assembly. The seat tubes assembly is pulled up through 90° and the bar 76 is locked automatically by the tapered bolt 86. The rear stays 67 are raised and the handle 66 is turned through 90° to clamp the rear stays lock in position.

(iv) Unfolding the front assembly. The front assembly is pushed forward on the slider 4 and then rotated downwards through 90°. The bar 27 is then automatically locked by the tapered bolt 24.

(v) Unfolding the handlebars. The handlebars are pulled up to the required height and the handle 13 is turned through 90° to clamp them against vertical movement. The handgrips are rotated outwards and are held at the pre-set angular position automatically when the dogs on sleeves 20 engage the recesses on collars 17.

The bicycle may be completely or partly folded to suit requirements. Thus complete folding using all the means provided reduces the machine to the smallest folded dimensions (30" × 14" × 9½") of which the arrangement is capable. Partial folding on the other hand may be employed if frequent folding and unfolding makes convenience more important than the magnitude of the folded dimensions.

The bicycle is fitted with standard caliper brakes on the front and rear wheels. FIG. 1 shows that the front brake is placed in the usual position on the front forks 9. The rear brake is mounted inside the rear frame 2. The brake cables (not shown in the drawings) are routed in such a way that they conform to the folding and unfolding operations described above.

The bicycle may be fitted with two handles (not shown in the drawings) so positioned on the front half and the rear half that they come together when the machine is folded, to facilitate carrying. Additionally or alternatively the bicycle may be supplied with a zip-up bag (not shown in the drawings) for carrying purposes. The bag may be clipped behind the saddle to act as a holdall when the bicycle is in use.

The invention has the following advantages:

1. It can be folded into very compact dimensions which enables it to be carried in restricted spaces such as the trunk of a small car, the cabin of a boat, the luggage rack of a rail carriage, or in a subway train. It may be easily stored in any convenient small space in the home or the office. 2. It is capable of being easily and quickly folded and unfolded without requiring special skills or tools. In particular unfolding is rapidly achieved because the following locks operate automatically when the sub-assemblies are unfolded to the riding position: (i) main hinge lock (ii) seat tubes lock (iii) front assembly lock and (iv) handlebars angular lock.

3. The large range of height adjustment on the handlebars and on the saddle, together with the range of possible angular positions for the handlebars, makes the bicycle useable by over 95% of men and women and by the majority of teenagers.

4. Since the drive is enclosed within the rear main frame the possibility of oil or dirt being transferred to the user's clothes when the machine is being ridden or carried, is reduced to a minimum.

I claim:

1. A portable foldable bicycle comprising a main frame divided into a front frame part and a rear frame part which are hingedly connected together, a front fork and a steering assembly hingedly and slideably connected to the front frame part, a saddle supporting assembly hingedly connected to the rear frame part, and locking means provided in operative association with each of the hinged connections, a main hinge pin arranged at one side of the main frame at its approximate mid point to permit the front half and the rear half to be positioned side by side in the folded position, a pair of apertured lugs on the hinge plate of the front frame part, to act with corresponding openings formed in the rear frame part, the lugs being locked in position by two spring loaded tapered bolts, in which the front fork and steering assembly comprises a fork supporting a front wheel, an inner tube fixed to the front fork, rotatably mounted in bearings supported in an outer tube attached at its upper end to a slideable bracket in such a way that the whole front assembly may be pivoted about the transverse axis of the bracket and then slid back above the front frame part, and a handlebar assembly attached to the front fork.

2. A bicycle as claimed in claim 1, in which an apertured lug fitted to the lower end of the outer tube is provided to act with a corresponding opening in the front end of the front frame part, the lug being locked in position by a spring loaded tapered bolt, and a handle to release the bolt.

3. A bicycle as claimed in claim 2, in which the handlebar assembly comprises a pair of spaced socket tubes in which are slideably received a pair of handlebar tubes with a clamping device at the top of the socket tubes to hold the handlebar tubes at the required height.

4. A bicycle as claimed in claim 3, in which the handlebar tubes are fitted with angularly adjustable collars provided with tapered recesses, with which tapered dogs on a pair of spring loaded sleeves on the handlebar tubes may engage when the hand grips are rotated to the pre set angular operating position.

5. A bicycle as claimed in claim 4, in which the saddle supporting assembly comprises a pair of seat tubes, each with a guide tube behind it, fitted in a base bracket which is hingedly attached to the top surface of the rear frame part, and a pair of saddle tubes, supporting the saddle, slideably received in the seat tubes, together with a clamping device at the top of the seat tubes, to hold the saddle tubes at the required height.

6. A bicycle as claimed in claim 5, in which an apertured lug fitted on the front lower surface of the seat tubes base bracket acts with a corresponding opening in the top surface of the rear frame part, the lug being locked in position by a horizontally mounted spring loaded tapered bolt, and a handle to release the bolt.

7. A bicycle as claimed in claim 6, in which a handle above the rear frame part is attached to a rod passing vertically through the rear frame part along the axis of a square tube containing the two main hinge spring loaded tapered bolts.

8. A bicycle as claimed in claim 7, in which pins through the rod act on helical cam profiles on the tapered bolts so that the bolts move vertically and release the main hinge plate lugs when the handle is rotated in an anti-clockwise direction.

9. A bicycle as claimed in claim 8, in which a pin on the handle acts on a lever to release the tapered bolt clamping the seat tubes base bracket when the handle is rotated in a clockwise direction.

10. A bicycle as claimed in claim 9, in which foldable rear stays are hingedly connected to the rear frame part at their lower ends and slideably connected to the seat tubes at their upper ends by a clamping device whose axis lies between the seat tubes and the guide tubes attached to the rear of them.

11. A bicycle as claimed in claim 10, in which the rear stays comprise two pairs of spaced tubes connected at their ends and at their mid points, and also connected by a transverse tube at their mid point, with the axis of the clamping device lying between each pair of spaced tubes.

12. A bicycle as claimed in claim 11, in which a clamping device is fitted to the rear stays consisting of a pair of bolts screwed into a central housing which acts as a mounting point for a handle attached to cams acting on a pair of pressure pads which clamp the rear stays and the seat tubes together in the operating position.

13. A bicycle as claimed in claim 12, in which release of the rear stays clamping device allows it to slide half way down the rear stays when these are rotated to their folded horizontal position and which also allows the clamping device to slide down relative to the seat tubes when the saddle supporting assembly is rotated to its folded horizontal position in which the rear stays lie outside the seat tubes.

14. A bicycle as claimed in claim 13, in which the rear end of the rear frame part is bifurcated to present a rear fork supporting a rear wheel which may contain a standard three speed hub.

15. A bicycle as claimed in claim 14, including a pair of pedal assemblies each consisting of a crank with a spigot at its free end on which is mounted a spring loaded locating sleeve with tapered dogs at one end acting on tapered recesses in a rotatable collar also mounted on the spigot, the collar having a threaded housing at one side into which a standard pedal is fitted.

16. A bicycle as claimed in claim 15, in which the drive between the pedals and the rear wheel is provided by a chain and sprocket drive positioned wholly within the rear frame part.

17. A bicycle as claimed in claim 16, in which the drive incorporates a step up gear train.

* * * * *